United States Patent

Cates

[11] 3,925,523
[45] Dec. 9, 1975

[54] OPPOSED AIR PATH WET-DRY COOLING TOWER AND METHOD

[75] Inventor: Robert E. Cates, Leawood, Kans.
[73] Assignee: The Marley Company, Mission, Kans.
[22] Filed: Nov. 12, 1973
[21] Appl. No.: 414,639

[52] U.S. Cl. .......... 261/151; 261/159; 261/DIG. 77; 261/DIG. 11; 261/109; 261/65
[51] Int. Cl.² .................................. B01F 3/04
[58] Field of Search ............ 261/151, DIG. 77, 109, 261/111, 65, 159

[56] References Cited
UNITED STATES PATENTS

| | | | |
|---|---|---|---|
| 978,986 | 12/1910 | Burhorn | 261/DIG. 11 |
| 2,165,197 | 7/1939 | Anderson | 261/158 |
| 3,635,042 | 1/1972 | Spangemacher | 261/150 |
| 3,689,367 | 9/1972 | Kassat et al. | 261/DIG. 11 |
| 3,731,461 | 5/1973 | Hamon | 261/DIG. 77 |
| 3,779,523 | 12/1973 | Furlong et al. | 261/DIG. 11 |
| 3,794,304 | 2/1974 | Cates et al. | 261/DIG. 77 |
| 3,831,667 | 8/1974 | Kilgore et al. | 261/DIG. 77 |
| 3,846,519 | 11/1974 | Spangemacher | 261/109 |

OTHER PUBLICATIONS
"How to Control Fog from Cooling Towers," J. R. Buss, *Power*, Jan. 1968, pp. 72, 73.

*Primary Examiner*—Tim R. Miles
*Attorney, Agent, or Firm*—Schmidt, Johnson, Hovey & Williams

[57] ABSTRACT

An induced draft, wet-dry cooling tower is provided having fog abatement and water conservation properties wherein upright, indirect type and crossflow, evaporative type heat exchange structures connected in serial water receiving relationship are located on opposite sides of a plenum chamber therebetween which in turn is in communication with an overhead air flow inducer, whereby air drawn through opposed heat exchange structures meets and comingles in the plenum chamber throughout the entire vertical extent thereof thus assuring maximum mixing of the wet and dry air streams before discharge thereof into the ambient atmosphere. Both heat exchange structures are supported at grade thus minimizing costs and permitting delivery of water to be cooled to the lower part of the indirect heat exchange structure which negates the necessity of providing main pipe risers as has heretofore been necessary in wet-dry towers. Dampers may be provided if desired in association with one or both of the heat exchange structures to permit selective variation of the amount, if any, of cold air from the atmosphere allowed to enter and flow through respective heat exchange structures.

20 Claims, 9 Drawing Figures

OPPOSED AIR PATH WET-DRY COOLING TOWER AND METHOD

This invention relates to the field of water cooling towers and especially to an improved wet-dry tower and method wherein hot water to be cooled is directed through an upright, grade-mounted indirect heat exchange structure for indirect thermal interchange with an induced airstream, and thereafter further cooled by evaporative, direct contact with an opposed crossflow airstream passing through separate, spaced, facing direct heat exchange structure which forms a separate water cooling section of the tower. By virtue of the arrangement of the indirect and direct water cooling sections of the tower in spaced, opposed, facing relationship, the oppositely directed ambient derived airstreams passing therethrough comingle and intermix throughout the vertical extent of the plenum chamber presented therebetween to assure maximum mixing of the wet and dry air streams before they are discharged vertically to the surrounding atmosphere. If constructed principally for fog abatement characteristics, the amount of hot air from the dry section allowed to mix with moist air from the wet section of the tower is controlled or regulated to produce a combined exit airstream having a relative humidity below the saturation curve of such mixture so that little if any fog is produced as a result of discharge of the heated moist air into the atmosphere. When used for water conservation applications, the relative sizes of the wet and dry heat exchange structures are correlated and permit maximum utilization of the dry section and subsidiary operation of the evaporative section as a trimmer to provide added cooling capacity under abnormally warm ambient conditions, or anytime the dry bulb temperature exceeds a predetermined level.

Water cooling towers for the most part fall into two distinct categories: so-called evaporative or wet towers; and indirect or dry towers. The most efficient type from a water cooling standpoint is the evaporative tower which involves separation of the water to be cooled into droplets or thin sheets so that ambient air may be moved through dispersed water to effect evaporative cooling thereof. Generally, in equipment of this type water to be cooled is delivered to a hot water distribution basin or spray structure and allowed to gravitate downwardly through an underlying fill assembly, so that air from the ambient atmosphere which is moved through the fill either in crossflow or counterflow relationship to the path of gravitation of the water, is brought into direct contacting relationship with the droplets of water or thin sheets thereof. Very efficient cooling of the water takes place primarily by evaporative effect but also through sensible heat exchange.

Although evaporative type cooling towers are in wide usage both in this country and around the world they present in some instances a serious problem because of the warm, moist fog which emanates therefrom under certain atmospheric conditions. This drawback, in some cases, makes it necessary to position the towers at great distances from plant machinery or other apparatus because the moisture in the fog associated with the tower can collect on the surrounding structures and cause corrosion thereof. The capability of providing an evaporative type water cooling tower which does not suffer from the problem of periodically exhibiting significant visible plume or fog under all climatic uses has definite advantages over presently available water cooling tower apparatus. Most importantly, a tower of these characteristics can be used in many locations not now feasible with present designs, not only from the psychological standpoint of substantial elimination of the visible fog plume, but also because of the amelioration of the physical problems associated therewith as well.

On the other hand, water cooling towers operating on the principle of indirect heat exchange of the liquid to be cooled with air flow derived from the ambient atmosphere do not normally cause problems of visible fog plumes or the like. This results from the fact that the water to be cooled is directed to, for example, finned tube heat exchangers which are in the path of induced ambient airstreams for indirect heat exchange therewith. As can be appreciated, the heated air flow returned to the atmosphere from dry towers does not produce fog since no moisture is added to the air stream.

However, use of indirect heat exchange cooling towers is objectionable for the reason that such constructions are generally inefficient when compared to evaporative type towers, and are therefore impractical where low temperature level heat loads must be handled. Further, when cold water return temperatures are lower than the ambient dry bulb temperature, indirect heat exchangers cannot be used. Dry towers are extremely costly to produce because of the extensive indirect heat exchange structure required, and in many cases would be prohibitively costly if it were attempted to construct a dry tower having equal water cooling capabilities to that of a given wet tower for the cooling of water from temperatures below about 130°F. The answer to evaporative type cooling tower visible fog or plume abatement is therefore not simply to substitute a dry tower for an evaporative type cooling tower, since finned tube heat exchangers or the like required for bringing the water to be cooled into indirect heat exchange with air from the ambient atmosphere are inherently much more expensive and inefficient than conventional evaporative cooling apparatus for equivalent cooling capacity.

Thus, at the present time completely dry water cooling towers for applications at low temperature levels are used only for small systems or in areas where water is either very expensive or not available in the quantities required for the makeup of a conventional evaporative type cooling tower unit when large volumes of water must be cooled. For example, in desert areas, there is a constant shortage of cooling water while in other locales the water supply falls sharply in winter months or periods of recurring drought, thus making it impractical to rely on local supply for cooling tower makeup water. This is especially significant when it is considered that required makeup water can amount to tens of thousands of gallons of water per minute in a typical large capacity evaporative cooling tower.

In order to overcome the problems outlined above with respect to both wet and dry towers, it has been suggested to employ a single tower which combines the operational characteristics or both the wet and dry towers in a single unit. One example of a so-called wet-dry tower is illustrated and described in U.S. Pat. No. 3,635,042 wherein a hyperbolic water cooling tower is shown as having an indirect heat exchange structure positioned above and serially connected to underlying evaporative heat exchange structure. In this construction, separate, geometrically parallel airstreams are drawn through the stacked water cooling apparatus, with hot water to be cooled being first pumped to the above-ground indirect heat exchange structure for partial cooling thereof, followed by evaporative cooling contact with a second crossflow airstream passing through the wet section during gravitational flow of the partially cooled water therethrough. These separate, geometrically parallel airstreams are then combined in a common plenum chamber and allowed to exit from the tower.

In practice, a tower as depicted in U.S. Pat. No. 3,635,042 has proven to be somewhat deficient in a number of respects. Specifically, because the respective water cooling sections thereof are in adjacent, stacked relationship, if conventional tower heights are to be maintained the vertical dimension of the wet sections must of necessity be reduced and consequently the capacity thereof lessened. Perhaps more importantly, because the indirect heat exchange structure is superimposed upon the fill assembly of the wet section, extensive mechanical support must be provided for these relatively heavy and cumbersome elements. Such above-ground disposition of the indirect heat exchange structure also demands that only relatively small manifolds, risers, and finned tube heat exchangers be employed because if these components were of significant size, the weight thereof would be impractical to adequately support. Equally important is the fact that for practical distribution of water to indirect heat exchange coils located above an evaporative fill assembly, a siphon-loop system must be used wherein specific minimum quantities of water are supplied to the finned tubes which in turn must be physically less than 33 feet in height. Alternately, a power-wasting, pressure consuming feed valve system to avoid siphons must be included. In contrast therewith, height and other physical parameters of an opposed path heat exchanger system is not similarly limited by any hydraulic considerations.

Yet another problem associated with the wet-dry towers heretofore available pertains to the relatively inefficient manner in which the separate, geometrically parallel airstreams are intermixed and comingled prior to return thereof to the atmosphere. Specifically, by virtue of the fact that the wet and dry airstreams are traveling in geometrically parallel relationship, there is little if any hydraulic impetus to assure thorough admixing thereof which is of course a requirement for maximum plume abatement at the tower discharge. Thus, in order to provide a combined wet-dry tower which effectively eliminates the problems of visible fog or plume under all conditions, it has heretofore been found necessary to construct such towers of relatively large dimensions in order to meet cooling specifications while at the same time provide assurance that the separate wet and dry airstreams will be effectively intermixed prior to return to the atmosphere.

It is, therefore, an important object of the invention to provide an opposed path wet-dry water cooling tower and method wherein hot water to be cooled is passed in serial order through indirect heat exchange and evaporative sections with the latter being located on opposite sides of a common plenum chamber whereby moist and dry heated airstreams drawn through respective cooling sections meet "head on" and are combined in the plenum area before being discharged to the ambient atmosphere whereby efficient mixing of the airstreams is obtained for maximum visible plume abatement at minimum equipment cost without significantly increasing the overall height or width of the tower.

As a corollary to the foregoing it is also an object of the invention to provide an opposed air path wet-dry water cooling tower wherein the construction and maintenance costs associated therewith are minimized and water cooling efficiency is maximized by provision of upright, grade-mounted indirect heat exchange structure which can be fabricated with relatively large manifold and finned tube components without the necessity of providing massive structural support at high elevations above grade therefor which would greatly increase the cost of the tower.

Another object of the invention is to provide an opposed air path wet-dry cooling tower wherein the height of the wet section thereof may be directly correlated to performance needs without regard to structural limitations since no indirect heat exchange structure is positioned thereabove, thereby permitting use of a wet section of required size and capacity without concern as to the vertical height thereof as is the case when a dry section is positioned above the evaporative portion of the tower.

A still further important object of the invention is to provide an opposed air path wet-dry water cooling tower apparatus wherein selectively adjustable dampers may be provided in association with the wet or dry heat exchange sections thereof or both, so that the flow of oppositely directed airstreams through the respective heat exchange structures may be varied at will to permit alteration of the heat transfer capacity of the complete tower on a seasonal basis or during periods of high dry bulb-low wet bulb temperatures while allowing use of a smaller sized and lower cost tower for a particular job than with an undampered tower. The dampers may also be operated to increase the visible plume abatement capability of the tower during periods of extreme low ambient temperature conditions or to minimize water consumption in the evaporative heat section when that section is not required to handle the heat load or only partial effectiveness is needed.

Also an important object of the invention is to provide an opposed path wet-dry water cooling tower wherein the indirect heat exchange structure is made up of a number of horizontally spaced sections separated by casing panels which serve to cause a plurality of individual, spaced, parallel hot dry airstreams to flow into the plenum chamber for mixing with the hot moist air from the evaporative section of the tower in direct opposition thereto. In this manner, more efficient comingling of the dry and moist air is accomplished by virtue of the face that the moist air is permitted to flow substantially unimpeded into the spaces between adjacent hot dry airstreams thereby producing turbulence and current eddies induced by the oppositely moving shear faces of the hot and moist air for intermixing thereof throughout the full height of the plenum area.

In its preferred forms, the cooling tower apparatus of the present invention is primarily concerned with the abatement of the visible fog or plume sometimes experienced in conjunction with evaporative cooling towers. In a typical evaporative mechanical or natural water cooling tower a certain proportion of the hot water to be cooled is vaporized during gravitation of the latter through the fill assembly of the tower. This moisture is incorporated into the airstream discharged from the top of the tower, either by the chimney effect of the natural draft hyperbolic tower, or the fan of an induced or forced draft cooling tower. During many climatical conditions the appearance of cooling tower induced fog can be seen above the fan cylinders or stack of the tower. Fog may occur any time of the year providing the two air masses which mix (i.e., the air mass leaving the top of the tower and the air mass of the surrounding ambient atmosphere) are at a temperature-humidity relationship which sustains fog. A relatively easy visible plume abatement problem is one which has a falling heat load during cooler weather. On the other hand, a difficult fog abatement application may be defined as one which heavily loads the exiting airstream with heat and moisture on a year-round basis regardless of ambient temperature conditions. A typical cooling tower application with a heavy heat load is one which must handle high water temperature relative to the entering air wet-bulb temperature. Heretofore the elimination or minimization of fog in the latter case has been considered to be an impractical and unobtainable goal except in the case of some prior wet-dry towers, which are deficient in other aspects as previously explained.

In the present opposed path wet-dry cooling tower apparatus, the existing waste heat stream which is conventionally directed to the cooling tower is actually beneficially used as the source of energy and means for producing a heated dry air mass which is comingled with the water saturated air which is discharged from the evaporative heat exchange structure of the apparatus. Of primary significance in this respect is the fact that such comingling occurs within the confines of the cooling tower casing and prior to mixture with the ambient atmosphere. Moreover, the admixing of the oppositely directed, opposed wet and dry airstreams is extremely efficient by virtue of the physical arrangement of the separate spaced, facing cooling sections of the tower. In any event, the air-water mixture exiting from the tower is normally well below the saturation point thereof. This exiting air, relatively dry by cooling tower standards, can then be found to produce further desirable ambient air-mixing condition above the tower discharge which precludes formation of fog in the form of a visible plume.

It is also to be noted that in the preferred form of the present invention wherein selectively actuatable damper structures are provided in association with one or both of the separate, opposed water cooling segments of the tower, further advantageous results obtain. In particular, a tower designed for the more difficult situation of continuous heavy heat load regardless of ambient temperature conditions, benefits from such damper structures in that the relative amounts of wet and dry air may be altered at will to compensate for ambient conditions at a given time. As can be appreciated, during wintertime operations when fog problems are most pronounced, dampers associated with the dry section of the tower preferably are located at their full open positions to allow a large proportion of dry ambient air to admix with that emanating from the wet section of the tower. In this connection, it may also be advantageous in some instances to provide piping structure which is operable to return the water to the cold water collection basin directly from the indirect heat exchange structure without passage through the evaporative segment of the tower. This mode of operation may be used during periods of extremely low ambient temperature when indirect heat exchange is sufficient to adequately cool the hot water directed to the tower.

On the other hand, in high temperature summertime conditions when efficiency of water cooling is the prime consideration, it may be desirable to partially or completely close the dampers associated with the dry section in order to increase the velocity of the airstream induced through the wet section of the tower to thereby correspondingly increase the water cooling efficiency thereof.

Dampers are also advantageous in another related aspect of tower operation. When the dampers are partially opened for example, a number of high velocity airstreams are generated which more thoroughly admix with the opposed airstream emanating from the remaining cooling section of the tower. This jetting effect is therefore a significant factor in producing maximum fog abatement, because of the more efficient admixing of the wet and dry streams which results therefrom.

Another helpful feature of the opposed air path wet-dry cooling tower of the invention stems from the fact that the dry section thereof can be employed to minimize the amount of water makeup required in the operation of the tower. Specifically, in arid regions where water is scarce or expensive, the dry section of the tower serves the function of lessening the amount of water required for continued operation of the tower. Accordingly, a full range of functions and advantages is provided through the use of opposed air path wet-dry cooling towers as disclosed herein.

In one specific embodiment of the present invention a dry section of substantially greater height and cooling capacity is employed in conjunction with a relatively small evaporative section. In this instance, the wet section has utility as a dry cooling tower trimmer or helper which may be activated during periods of the year when the dry-bulb temperature is at an extremely high level accompanied by relatively low wet-bulb temperatures. In general, this embodiment requires only minimal makeup water because of the small evaporative section thereof and is therefore especially adapted for use in arid regions where water supply is a major consideration. As can be appreciated, the availability of a reasonably priced opposed air path wet-dry cooling tower having the properties of being operable under varying climatic conditions, while requiring only limited water makeup, permits a potential user to plan his plant for most efficient operation and location without giving primary attention to the proximity of adequate makeup water supplies. For example, a power plant site having minimum water availability can be extended considerably beyond its normal anticipated generating capacity by operating the wet portion of the wet-dry tower only during periods of the year when high dry-bulb temperatures are encountered. As a result, it is possible to construct a large power plant on a site that could not otherwise be considered because of the limited water quantities available for a conventional wet cooling tower system requiring significant quantities of makeup water on a continuous basis. In certain instances, the generating station may be positioned closer to the load center than would otherwise be possible, or located in proximity to a fuel supply even though water shortage would be a negative factor if it were not for the use of an opposed wet-dry cooling tower as disclosed in the present invention.

When the wet cooling segment of a tower is used as a helper or trimmer, the dry finned tube exchanger section thereof is proportioned much larger than the wet exchanger section. Otherwise, the wet section is preferably sized to accommodate the design temperature conditions at the peak dry-bulb and coincident wet-bulb temperatures likely to be encountered in a given geographical area during normal summer weather. Because of the relatively high cost of the dry exchanger section as a part of the entire cooling tower unit, the trimmer or helper design necessarily has primary application in those instances where water consumption must be minimized.

Figure 5:
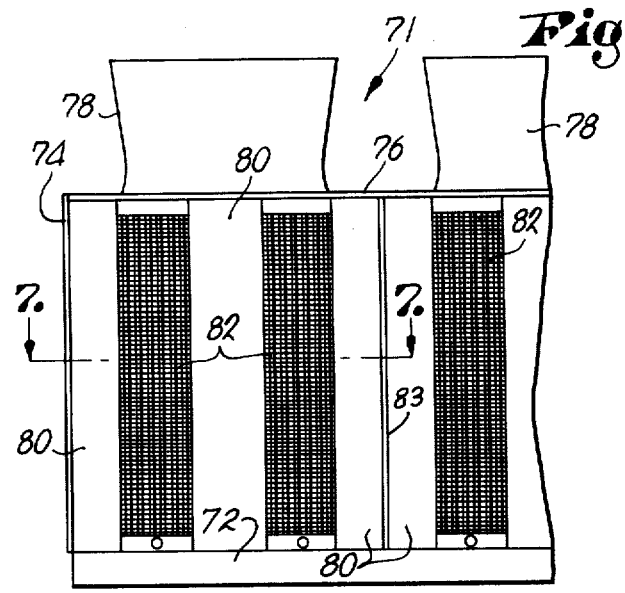
Figure 6:
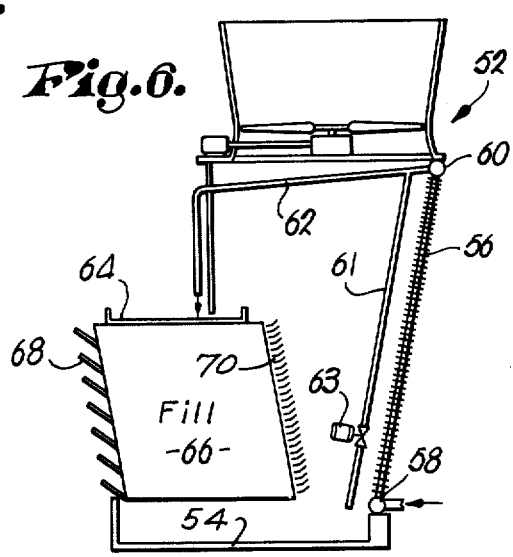
Figure 7:
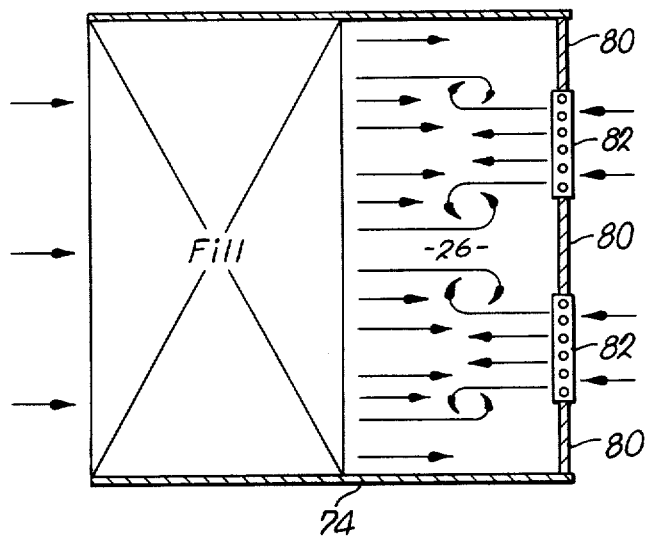
Figure 8:
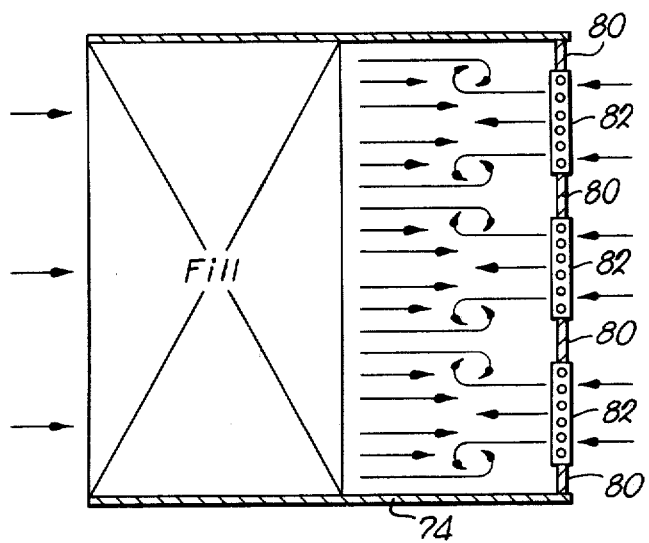
Figure 9:
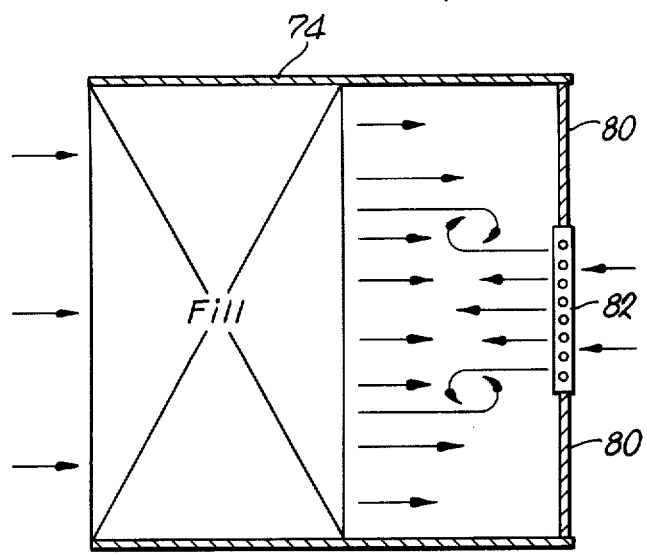

FIG. 5 is a fragmentary side elevational view of a combination opposed air path wet-dry cooling tower having a plurality of water cooling cells each provided with a number of individual banks of finned tube heat exchangers located in spaced relationship with air blocking casing panels therebetween that segregate air flowing through the indirect heat exchangers into parallel hot dry air streams which meet and comingle with moist hot air from the evaporative section of the tower;

FIG. 6 is an essentially schematic, cross-sectional representation of an opposed path wet-dry cooling tower wherein the finned tube heat exchange segment thereof is of substantially greater height than the corresponding opposed evaporative fill segment;

FIG. 7 is a fragmentary, generally schematic cross-sectional view taken substantially on the line 7—7 of FIG. 5; and FIGS. 8 and 9 are fragmentary, schematic cross-sectional views similar to the showing of FIG. 7 and illustrating the way in which the indirect heat exchangers and associated casing panels may be segregated into any one of a number of different configurations for splitting the hot dry air into any desired number of separate flow paths relative to the opposing hot moist air directed into each tower cell plenum chamber area.

The induced draft crossflow water cooling towers depicted in FIGS. 1–4 and broadly designated 10 are provided with an underlying cold water collection basin 12 which is conventionally fabricated from concrete or other corrosion-resistant material. A series of upstanding, upflow, one-pass finned tube heat exchangers 14 are supported by footing structure which as depicted can be one upright end wall of basins 12 and are disposed in a generally sloped orientation with respect to the vertical such that the upper end thereof extends outwardly beyond the transverse dimension of the underlying basin 12. The evaporative section of the tower on the opposite side thereof has an inclined outer face which substantially conforms to the angle of water pull back in the fill assembly produced by the cross-flowing air moving therethrough. Arrangement of the dry section at an angle approximately equal to but opposite that of the outer face of the wet section imparts an aesthetically pleasing appearance to the overall tower configuration. Furthermore, a degree of natural hail protection is afforded the indirect heat exchangers by virtue of the tilted configuration thereof, and moreover the width of cold water basin 12 also be correspondingly reduced. A hot water delivery pipe 16 leading from the distribution manifold 17 which may be located below grade if desired is operatively connected to each lower elongated hot water header 18 which extends the width of heat exchanger 14 and communicates with the respective one-pass finned tubes of heat exchanger 14.

An upper, transversely extending header 20, which may be either open or closed, is operatively coupled to the finned tube heat exchanger units 14 and in turn in connected to one or more crossovers 22 comprising pipes or open top trough-like flumes for carrying partially cooled water from the indirect exchanger headers 20 to the hot water distribution basin 42 forming a part of the evaporative section of tower 10. A generally horizontal fan deck 24 extends in covering relationship to plenum chamber 26 which is defined by opposite end walls of the tower casing as well as by the upright heat exchangers 14 and the spaced, opposed, facing evaporative fill assembly 28. Fan deck 24 overlying chamber 26 has at least one aperture therein for communicating the ambient atmosphere with plenum chamber 26. An upstanding, venturi-shaped fan cylinder 30 projects upwardly from deck 24 in surrounding relationship to the aperture therein. A multi-bladed fan 32 is positioned within cylinder 30 at the point of greatest constriction thereof and is driven by means of a motor 34 positioned externally of the cylinder and mounted above fan deck 24. Motor 34 has a conventional drive shaft 36 which extends through the wall of cylinder 30 and is in operative connection with a reduction gearbox 38 that is in turn connected to fan 32. In preferred embodiments, motor 34 is of the single speed variety. Alternate embodiments may employ motors of multi-speed, or variable speed in order to permit air flows of varying magnitudes to be drawn through the underlying cooling tower 10. A series of elongated, transversely inclined, vertically stacked inlet louvers 40 form the outermost face of fill 28 and the stack thereof is inclined to follow the contour of the adjacent faces of the fill assembly 28 to thereby prevent splash-out of water and to contain such water in corresponding fill structures without significantly interfering with entry of air from the atmosphere into the interior of tower 10.

Although not illustrated in detail in the drawings, it is to be understood that the evaporative heat exchange fill assembly 28 is of conventional nature and for example, may comprise a series of fill members comprising either horizontally and vertically spaced, generally horizontally disposed wooden slats, synthetic resin, perforated or non-perforated fill panels, or horizontally extended sections of corrugated asbestos cement board. The fill members are preferably carried by a suitable corrosion-resistant supporting grid in disposition such that water gravitating from a plurality of openings in the bottom of distribution basin 42 thereabove contacts the fill members and is broken up, forms films of water thereover, and drips from the bottom of each fill member to cause the air entering the fill to come into contact with water of maximum surface area for most efficient cooling thereof prior to gravitation of the water into underlying collection basin 12. Although the fill construction described above is conventional for a cross-flow type of tower as illustrated in the drawings, it is to be understood that any other equivalent fill structures may be used with equal facility in the present invention without departing from the principles thereof. In addition, conventional, upright mist or drift eliminator structure 29 is complementally positioned adjacent the inclined exit face of the fill for the purpose of limiting the amount of entrained water entering plenum chamber 26 and subsequently discharged to the atmosphere. The wet and dry heat exchange structures thus have upright air inlets and corresponding outlets which discharge hot dry and moist air respectively into the common plenum area therebetween.

In many instances the cooling towers hereof can be sized most economically for a particular application by provision of a damper structure in association with one or more of the heat exchange elements thereof to permit selective control over the separate airstreams passing through the heat exchangers. As illustrated schematically in FIGS. 2–4, a series of stacked, movable, horizontally disposed, selectively actuatable dampers 44 can be provided which are either individually manually operable or alternately interconnected by common control mechanism for simultaneous movement. The damper structure may be employed on tower 10 in a number of operative dispositions, depending principally on the effects desired. In particular, a given tower 10 may include a set of dampers 44 in adjacent, covering relationship to the upright finned tube heat exchangers 14 on either the interior or exterior face thereof, or the dampers can be placed adjacent the exit face of the wet section of the tower as shown in FIG. 4.

Figure 1:
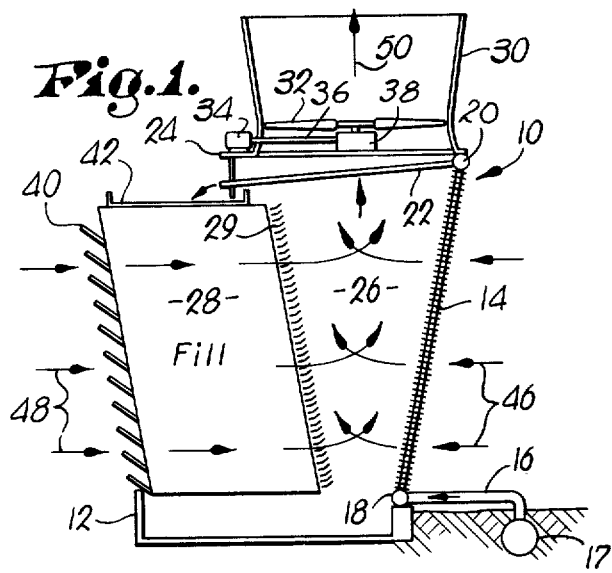
FIG. 1 is an essentially schematic, cross-sectional representation of an opposed air path wet-dry cooling tower employing upright, grade-mounted finned tube heat exchangers in conjunction with spaced, opposed, facing evaporative heat exchange structure for cooling hot water directed to the tower in serial order while minimizing the problems associated with visible fog or plume.

In operation, hot water which may be derived from a condenser forming a part of a power plant or the like, is directed via distribution manifold 17 and delivery pipes 16 to lower headers 18 and thence passes upwardly through the respective finned tube heat exchangers 14 for indirect cooling by ambient derived air passing therethrough along the paths illustrated by arrows 46 in FIG. 1. Fan 32 causes air from the ambient atmosphere to be drawn through the passages between the finned tube heat exchangers 14 at a rate to partially cool the water moving upwardly through the latter to a predetermined intermediate temperature level. As a result, the cool air from the ambient atmosphere is brought into indirect heat exchange with the hot water flowing upwardly through the one-pass finned tube heat exchangers 14. In this connection it should be noted that although one-pass finned tube heat exchangers are preferred for ease of operation, multi-pass exchangers may be employed to achieve larger temperature differentials by indirect cooling.

When the partially cooled water reaches the upper ends of the finned tube heat exchangers 14, it is collected within headers 20 for transfer via crossovers 22 to basin 42. As depicted in the drawings, crossovers 22 are inclined to facilitate gravitational delivery of the partially cooled water to hot water distribution basin 42 above evaporative fill section 28. At this point, the water descends onto the fill elements and a second, opposed ambient derived airflow illustrated by the arrows 48 comes into direct, cross-flow thermal interchange therewith to further cool the water by evaporation and sensible heat exchange.

It has been found that an unexpectedly efficient mingling and intermixing of the wet and dry air occurs in plenum chamber 26. This is believed to be attributable to the velocity and disposition of the separate airstreams which are opposed and meet in direct opposition to one another. Moreover, in view of the fact that the wet and dry cooling sections of the towers in FIGS. 1–4 are of substantially equal height, intermixing of the wet and dry airstreams occurs over the full height of the cooling tower to thereby maximize the comingling of the wet and dry streams prior to return thereof to the atmosphere. Since the hot water enters the dry exchanger at the bottom, the air through the lower portion thereof is heated the most and, having the greatest contact time with hot, moist air with plenum chamber 26, has a more effective opportunity to intermix and uniformly combine with the moist airstream.

The described direct comingling of the respective wet and dry airstreams is to be contrasted with the operation of a conventional wet-dry cooling tower as illustrated in U.S. Pat. No. 3,635,042. In the latter apparatus wet and dry airstreams flow in geometrically parallel relationship and therefore do not achieve the degree of internal comingling of wet and dry air which is inherent in the apparatus disclosed herein. The resulting merged airstream (referred to by the numeral 50) leaving tower 10 is in many applications less susceptible to visible fog or plume formation because of the more efficient use, disposition and directivity of the relatively dry air emanating from the the indirect heat exchange section of the tower, than in the case of prior wet-dry towers.

In addition to the effects mentioned above, the towers of the present invention also present a number of other special advantages. In particular, the use of one-pass, upflow finned tube heat exchangers eliminates the problem of clogging thereof which can be troublesome if contaminated or brackish water are to be cooled.

The use of upflow indirect heat exchangers in the dry section of the opposed air flow path tower which thereby eliminate the necessity of siphon loop water supply as previously noted, permits utilization of finned tubes of sufficient diameter to avoid clogging thereof with foreign materials. Siphon systems on the other hand, place inherent limitations on maximum allowable tube diameter which make them susceptible to plugging in many applications and can cause serious operational and maintenance problems. Also, the top headers 20 may alternately be open-top flumes providing ready access thereto for simple maintenance of clean flow conditions. This feature is not feasible in siphon loop supply systems since opening of the loop destroys the siphon effect and requires complete reestablishment thereof after reclosing of the header covers.

Moreover, because the indirect finned tube heat exchangers 14 are grade-mounted, it is possible to employ delivery manifolds and headers of substantially larger diameter and length than would be possible in the case of conventional wet-dry cooling towers. In prior wet-dry towers the indirect heat exchange section thereof has been placed atop the evaporative cooling portion for gravitational flow of partially cooled water thereto;

therefore, extensive mechanical support has been required for these relatively heavy indirect heat exchangers and the associated headers and accordingly their size was severely limited. In a typical opposed path tower as disclosed herein, more than one-half of the header structure normally employed can be eliminated which of course leads to significant savings in exchanger first cost, construction, and maintenance. Furthermore, towers of the present invention employ grade-mounted or in some instances subgrade-mounted manifolds and therefore the water-load carrying capacity thereof can be of any desired size, even up to 9 or 10 feet in diameter. As an ancillary advantage in the use of subgrade manifolds, problems associated with thermal expansion are completely eliminated because such stresses are imparted to the soil itself; this in turn permits use of more economical materials such as polyethylene pipe while eliminating the need for expensive expansion joints in the main manifolds.

The use of separate riser means which are required in conventional wet-dry towers to convey water from ground level to the above-ground indirect heat exchange structures are eliminated in the towers disclosed herein. This results from the fact that through the use of the preferred one-pass, upflow finned tube exchangers 14, water is conveyed to the upper part of tower 10 during initial precooling thereof. Additionally, the one-pass, upright finned tube heat exchangers permit the use of gravitational delivery crossovers 22 for delivering the partially cooled water to fill assembly 28 at atmospheric pressure. In contrast, parallel path wet-dry towers heretofore suggested employed a siphon loop in the indirect heat exchange system to lessen pumping requirements and facilitate overall water-cooling operations. This capability of atmospheric pressure operation results in low pumping requirements due to lower tube velocity, single pass coil circuit length and elimination of end wall riser pressure losses and moreover, facilitates operation of the towers of this invention since only a constant positive pressure need be maintained throughout the height of the air-cooled heat exchangers during any pump-operating mode. As a result, the system is inherently relatively insensitive to pumping system changes and does not present a challenge to the ingenuity of the power plant designer to properly execute all of the necessary valving and control modes required to preclude improper siphon initiation of water distribution.

All of the constructional factors outlined above serve to lessen the need for cumbersome extensive mechanical support for the water-cooling tower. Furthermore, the cooling tower structure can be significantly taller with large fills and indirect heat exchangers, and consequently the fill volume of the tower can be reduced while nevertheless meeting design specifications. In addition, the cold water collection basin need underlie only the evaporative fill section. By virtue of these factors, a smaller underlying basin structure 12 can be employed than would be the case with a standard wet-dry tower having the same cooling capacity. This represents a considerable economy since in many instances the cost of the underlying cold water collection basin represents as much as one-quarter of the total cost of the tower.

In addition, because of the increased efficiency of opposed air path wet-dry towers, it is generally possible to employ individual cells of greater length than heretofore feasible. This gives greater distance between adjacent fans and as a consequence any plumes emanating therefrom remain separated and do not merge to form a common more persistent plume rising high in the sky. Furthermore, this spacing reduces problems associated with recirculation of warm moist air into the air inlets of the respective cooling sections of the tower to improve the thermal efficiency thereof.

As alluded to previously, the towers of the present invention advantageously include selectively actuatable damper structures in association with one or both of the separate water cooling sections thereof. For example, by utilizing a damper assembly 44 in association with the dry heat exchange structure for shutting off the air which normally passes through the upright finned tube heat exchangers 14 during periods of the summer when high dry-bulb temperatures are incurred coincident with low wet-bulb temperatures, a smaller cooling tower may be used for a particular application and still meet the requirements for that particular job. This is for the reason that when high dry-bulb temperatures occur along with low wet-bulb temperatures, visible fog flumes are not normally generated and the need for fog abatement apparatus is substantially lessened if required at all. By closing off the airflow to the dry finned tube heat exchange structure, the airflow through the evaporative heat exchange portion of the tower is correspondingly increased, causing the total unit to operate at lower water temperatures. In the event a specified water out temperature must be held by the tower, the damper structure can be used as a device for increasing the heat transfer capacity of the tower during high dry-bulb, low wet-bulb temperatures and permits minimization of the total tower size without affecting its ability to meet the design specifications. As a consequence, an opposed air path wet-dry cooling tower having adjustable damper means for influencing the airflow to each finned tube heat exchange structure provided on the tower permits utilization of a cooling unit of smaller size and thus of less installed capital cost than a system that does not have a controllable or adjustable damper. This of course, presupposes that the cost of an adequate damper system and its attendant controls can be installed on a particular tower at an expense less than the cost difference between a dampered and undampered cooling tower.

Figure 2:
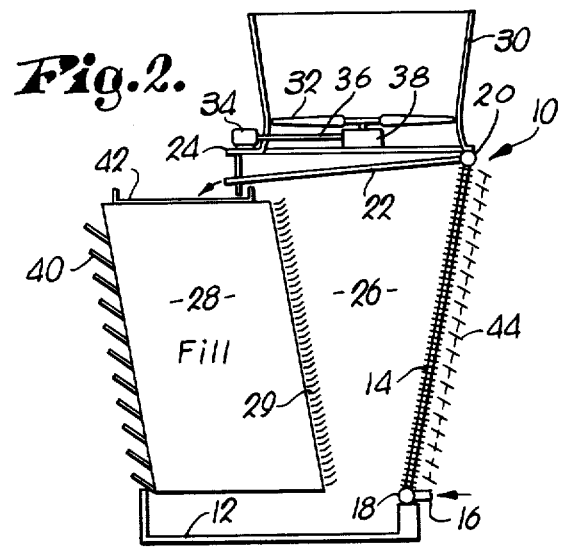
FIG. 2 is an essentially schematic, cross-sectional view of a tower identical to that described in connection with FIG. 1, but with selectively actuatable, movable damper means provided in adjacent, covering disposition to the exterior or the finned tube heat exchangers of the tower.
Figure 3:
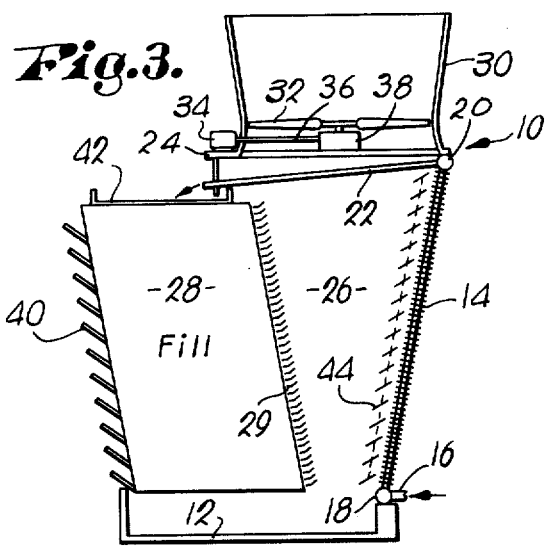
FIG. 3 is an essentially schematic, cross-sectional view of an opposed air path wet-dry cooling tower as depicted in FIGS. 1 and 2, shown with selectively actuatable damper means disposed in adjacent covering relationship along the interior of the finned tube heat exchange portion of the tower.
Figure 4:
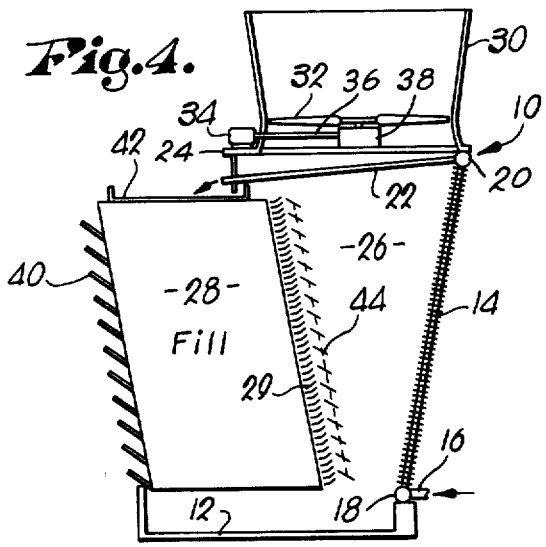
FIG. 4 is an essentially schematic cross-sectional view as depicted in FIGS. 1–3, but showing selectively actuatable damper structure in adjacent covering disposition to drift eliminator structure defining the exit face of the evaporative fill section of the tower.

Referring again to the drawings and particularly FIGS. 2 and 3 thereof, it will be seen that the selectively actuatable damper structures 44 can be positioned adjacent either the interior or exterior face of the upright finned tube heat exchangers 14. For reasons of aesthetics, and to provide a partial barrier between the carryover water and the finned tubes, it is preferable to position the dampers 44 interiorly of the tower and adjacent the finned tube heat exchangers 14 as depicted in FIG. 3. However, when so positioned, the damper structures are somewhat susceptible to corrosion by virtue of being disposed in the warm, moist, humid air present in plenum chamber 26. Accordingly, provision of the dampers 44 in adjacent, covering relationship to the exterior face of the upright finned tube heat exchangers 14 is in some instances preferred because of the lessening of corrosion thereof.

In another embodiment shown in FIG. 4, the damper structure 44 is illustrated as being positioned adjacent the exit face of fill assembly 28 and proximal to the drift eliminators 29. Dampers located outside the cooling tower, for example in the plane of louvers 40, may be subject to operational problems attributable to freezing of the linkage or the blades of the damper system during periods of the year when precipitation deposits can undergo thawing and refreezing if the tower is located in an area where cold weather is encountered unless suitable precautions are taken to avoid such freeze-ups. When the damper structure 44 is located within the tower as illustrated in FIGS. 3 and 4, the materials chosen for fabrication of the dampers must be selected so that undesirable corrosion of the parts is avoided. In any event the dampers 44, whether associated with the dry and/or wet cooling sections of the tower, are operable to permit selective variation of the amount of air drawn therethrough and therefore are a primary means of regulating the level of abatement of the visible fog or plume rising from the tower. As explained, the plume abatement capability of a dampered tower is greatest when the air drawn through the evaporative cooling section thereof is lessened with respect to that from the dry section. However, as a consequence of such plume abatement, the water cooling capacity of the tower is somewhat diminished since the indirect cooling portion is less efficient than the evaporative section.

In additional embodiments, tower 10 is provided with variable pitch fan blades, variable speed or multiple speed fan motors, or means for shutting down both the air and water flow to adjacent fan cells when reduction in capacity is required, so that freeze-up of the tower during light loads and very cold weather conditions can be avoided. This adjustment capacity also insures that an adequate flow of hot water and proportional airflow through the dry and wet sections of the tower to prevent formation of a visible plume above the tower, even when the load thereon decreases or air through the exchanger sections of the tower decreases for any reason.

FIG. 6 illustrates a tower 52 wherein the evaporative heat exchange section thereof is used as a helper for a larger primary dry finned tube heat exchange section to increase the cooling capability of the tower without requiring large volumes of water makeup. In this regard, tower 52 is provided with a conventional cold water basin 54, and a plurality of upstanding one-pass, finned tube heat exchangers 56 with approximate upper and lower headers 58 and 60, substantially as described in accordance with tower 10. Additionally, the fan and stack configuration, as well as the motor and fan deck portions of tower 52, are identical with those described above with reference to tower 10. In this instance however, a cross flume or conduit 62 having a depending delivery end extends from upper header 60 for delivery of partially cooled water to hot water distribution basin 64 situated atop fill assembly 66. Fill assembly 66, associated louver structure 68 and drift eliminator structure 70 are the same as those described for tower 10, except for their relative sizes. Furthermore, tower 52 can advantageously be equipped with damper means (not shown) in any of the operative dispositions discussed above.

In the operation of tower 52 during the summer months or when makeup water is scarce, the indirect heat exchange section of the tower is preferably left fully open to maximize the indirect cooling of hot water directed to the tower. In order to sufficiently cool this water, it may be necessary to direct the same to the evaporative section of the tower subsequent to the initial precooling step even though this of necessity requires makeup water for that lost during evaporative cooling. On the other hand, in cooler weather and particularly during winter months when ambient temperatures are lower, it may be sufficient in many instances to simply direct the water to the indirect cooling section of the tower and thence directly to the cold water distribution basin therebelow via bypass conduit 61 and associated control valve 63. In this instance, very little if any makeup water is required because the evaporative section of the tower is not in operation. In a completely dry water cooling tower, the practical approach limit of the ambient air dry-bulb temperature to that of the water to be cooled is about 25° to 50° F., whereas in an evaporative type cooling tower, the practical approach can be from 12° to 20° wet-bulb. As a consequence, an evaporative type cooling tower is more efficient than a dry tower for most applications with water makeup being the only significant problem aside from maintenance costs of the tower. The addition of evaporative heat exchange structure to tower 52 permits operation thereof under most circumstances without evaporative cooling being required as an adjunct to the overall cooling process, but with the capability of immediately and selectively adding the wet cooling sections as a part of the system upon demand and as needed to handle high dry-bulb, low wet-bulb temperature conditions.

The wet heat exchange section of tower 52 thus acts as a helper for the dry cooling sections thereof to permit trimming of the size of the finned tube structure over what would be otherwise required for a particular application. As a result, the cooling tower of the type illustrated in FIG. 6 may be used in instances where a dry finned tube water cooling tower would be completely impractical from a cost standpoint. This is for the reason that if the dry tower is sized so as to handle the load thereon at the highest dry-bulb temperature condition likely to be encountered at that particular geographical location, the size and therefore the cost of the tower would in most instances be prohibitively expensive as compared with other ways of cooling the water. However, by including the relatively small evaporative trimmer section as a part of the overall tower, the size of the dry heat exchange section thereof may be significantly reduced while still maintaining the tower within design specifications. In many cases, the overall cost of the tower is thereby brought within practical economic limits.

The water cooling tower 71 shown in FIG. 5 has a plurality of individual cooling cells therein which are preferably individually controllable in order to vary the cooling capacity of the overall tower in response to changing heat loads. In this instance, tower 71 includes an elongated cold water collection basin 72, an upstanding cased end wall 74, and a common, horizontally positioned fan deck 76 having apertures therein for communication of the atmosphere with the interior of the overall tower 71. Furthermore, a plurality of upstanding fan cylinders 78 are connected to the fan deck 76 in circumscribing relationship to the apertures therein, identical with that described above with reference to towers 10 and 52. In some applications, upstanding partitions 83 may be provided between the respective cells of cooling tower 71 but in general such partitions are not needed and a single, elongated, common plenum chamber may be provided.

In the particular embodiment shown in FIG. 5, the upstanding inclined finned tube heat exchangers 82 are shown as not encompassing the entire length of celled tower 71 but only a certain percentage thereof, thereby leaving spaces therebetween which are closed by casing panels 80. As can be appreciated, this particular embodiment enables the tower 71 to more economically handle problems associated with fog plumes. The basic tower selection includes only as many dry sections as are required for the desired plume abatement capability. Be separating the dry sections with cased wall areas, separate streams of dry air enter the plenum through each section. This increases the number of zones of intermixing and consequent plume reduction within the tower. In all other respects (e.g., the header and crossover structure and the configuration of the separate cooling sections of the tower), tower 71 is identical to that described with reference to tower 10. Moreover, tower 71 may be provided with selectively actuatable damper structure in conjunction with either one or both of the cooling sections thereof, for the purposes fully explained previously.

Although in the preferred forms of the invention open top flumes are shown and described for transferring partially cooled water from the dry coil section of respective towers to the evaporative portion thereof, a closed conduit system may be used, or in lieu thereof several pipes emanating from header nozzle outlets at the top of the air cooled heat exchanger used as the fluid transfer means.

FIG. 7 is a schematic horizontal cross-sectional showing through FIG. 5 of the air stream pattern where dry air flowing into plenum 26 past the casing walls 80 leaves shielded zones therebehind extending the full height of the tower for ready penetration of moist air thereinto from the tower fill assembly. Turbulent mixing of dry and moist air occurs in each of these shielded zones by virtue of the fact that the shear interfaces between the oppositely moving moist and dry air streams causes a swirling motion to occur toward and into each shielded area for more thorough intermixing of the respective air flows than would otherwise occur.

As is evident from FIGS. 8 and 9. the same swirling intermix of moist and dry air occurs behind each casing wall 80 along the length of a tower regardless of the number of individual heat exchangers and separator casing walls therebetween.

Having thus described the invention, what is claimed as new and desired to be secured by Letters Patent is:

1. In a water cooling tower, the combination of:
spaced, separate, horizontally aligned, indirect and evaporative heat exchange structures adapted to receive hot water to be cooled for lowering the temperature thereof;
means for serially delivering the hot water first to one of said heat exchange structures for initial cooling thereof and thence to the other of said heat exchange structures for further cooling of the same,
said heat exchange structures each having ambient air inlets and respective hot air outlets both communicating with an enclosed common plenum area which discharges to the atmosphere; and
means communicating with said plenum area for simultaneously moving ambient derived first and second air streams through the heat exchangers respectively from the inlets thereof to said outlets of the same in thermal interchange relationship with water passing therethrough whereby hot dry air is directed into said plenum area from the indirect heat exchange structure and hot moist air is discharged into the plenum area from the evaporative heat exchange structure,
the heat exchange structures being located relatively in sufficiently closely spaced relationship and disposition causing the hot dry air to exit from the indirect heat exchange structure and the hot moist air to leave the evaporative heat exchange structure along respective paths for collision intersection of the same within and throughout the common vertical height thereof in the plenum area to assure thorough admixing thereof prior to discharge of the mixture to the atmosphere.

2. A cooling tower as set forth in claim 1 wherein said heat exchange structures are located in opposed relationship with the air outlets thereof in direct, facing disposition on opposite sides of the plenum area.

3. A cooling tower as set forth in claim 1 wherein said indirect heat exchange structure is a finned tube heat exchanger.

4. A water cooling tower as set forth in claim 1, wherein said indirect heat exchange structure comprises a plurality of upright, sloped, one-pass finned tube heat exchangers positioned in the path of said first airstream, and means for directing hot water to the lower ends of the finned tubes and operable to collect the partially cooled water at the upper extremity thereof for subsequent delivery to the evaporative heat exchange structure.

5. A cooling tower as set forth in claim 1 wherein said indirect heat exchange structure is discontinuous along the length thereof, there being air blocking panels between adjacent end sections of proximal portions of the heat exchange structure.

6. A water cooling tower as set forth in claim 1 wherein said evaporative heat exchange structure is positioned in the path of said second airstream and comprises a fill assembly having a series of units for receiving water gravitating thereon and operable to increase the surface area of the water exposed to air passing therethrough, and means for delivering partially cooled water from the indirect to the evaporative heat exchange structures for gravitational flow through the latter.

7. A water cooling tower as set forth in claim 6 wherein said delivery means comprises at least one inclined crossover conduit extending from the top of the indirect heat exchange structure to the upper end of the evaporative heat exchange structure for gravitational delivery of water thereinto.

8. A water cooling tower as set forth in claim 1 wherein said means for moving cool ambient air through the heat exchange structures comprises a fan positioned above said separate heat exchange structures, there being outside wall structure cooperating with the heat exchange structures to define a common plenum area therebetween receiving hot dry air and hot moist air from the indirect and evaporative heat exchange structures respectively to assure thorough admixing thereof throughout the plenum area.

9. A water cooling tower as set forth in claim 8 wherein said wall structure includes a generally horizontal, apertured fan deck overlying said plenum chamber, there being an upstanding, venturi-shaped fan stack attached thereto in circumscribing relationship to said aperture and a driven, multi-bladed fan within said stack operable to draw cool air from the atmosphere through said heat exchange structures and to discharge the hot air mixture back to the surrounding atmosphere.

10. A water cooling tower as set forth in claim 1 including means associated with said tower for selectively varying the amount of air permitted to pass through said indirect evaporative heat exchange structures.

11. A water cooling tower as set forth in claim 10 wherein said means for varying the air through the heat exchange structures comprises a series of shiftable dampers movable from an air blocking position to a position permitting substantially unrestricted air flow therepast.

12. A water cooling tower as set forth in claim 11 wherein said dampers are positioned in adjacent, covering disposition to the exterior of said indirect heat exchange structure.

13. A water cooling tower as set forth in claim 11 wherein said dampers are positioned in adjacent, covering disposition to the interior of said indirect heat exchange structure.

14. A water cooling tower as set forth in claim 11 wherein said dampers are in adjacent, covering disposition to the outlet face of said evaporative heat exchange structure.

15. A method of efficiently cooling hot water and abating the fog plume from a water cooling tower comprising the steps of:
 moving ambient air from the atmosphere along two separate, closely spaced, horizontally aligned, opposed, collision paths of travel;
 directing hot water to be cooled to a first zone positioned in the path of one of said airstreams for indirect heat exchange therewith to thereby partially cool the water and produce a relatively dry, heated airstream emanating therefrom;
 subsequently directing the partially cooled water to a second zone positioned in the path of the remaining airstream for direct, evaporative heat exchange therewith to thereby further cool the water and produce a moist heated airstream emanating therefrom; and
 comingling the dry heated and moist heated, opposed oppositely moving airstreams throughout the common vertical heights thereof for thorough admixing of the same prior to return thereof to the ambient atmosphere.

16. A method as set forth in claim 15 wherein is included the steps of directing said hot water upwardly through said first zone for indirect heat exchange with one of said airstreams, followed by moving said partially cooled water to said second zone and allowing the same to gravitate through the latter for evaporative thermal interchange with said remaining airstream.

17. A method as set forth in claim 15 wherein is included the step of directing the water to be cooled through a plurality of spaced areas to cause the hot air emanating therefrom to meet the hot moist airstream as a number of separate flows for increased comingling of the hot and dry airstreams by the turbulence and swirling produced by the oppositely moving airstreams at the interfaces thereof.

18. A method as set forth in claim 15, wherein is included the steps of varying the amount of heat exchange permitted between the water and air in respective zones as necessary to produce a mixture of dry and moist air returned to the atmosphere which has a relative humidity sufficiently low that it does not significantly produce a visible fog plume when such mixture meets and mixes with the ambient air.

19. A method as set forth in claim 18 wherein said step of varying the amount of heat exchange in respective zones includes the step of selectively blocking flow of ambient air to a predetermined extent through at least one of the zones.

20. A method as set forth in claim 19 wherein is included the step of increasing the flow of ambient air through one of the zones coincidentally with the step of blocking flow of air through the other zone.

* * * * *